(12) United States Patent
Ding et al.

(10) Patent No.: US 10,965,358 B2
(45) Date of Patent: Mar. 30, 2021

(54) DYNAMIC SIGNAL TRANSMISSION STRUCTURE AND BEAMFORMING METHOD

(71) Applicants: Shenzhen Institute of Terahertz Technology and Innovation, Guangdong (CN); Shenzhen Institute of Terahertz Technology and Innovation Co., Ltd., Guangdong (CN)

(72) Inventors: Qing Ding, Guangdong (CN); Chong Han, Guangdong (CN); Chen Li, Guangdong (CN); Shitao Yan, Guangdong (CN)

(73) Assignees: SHENZHEN INSTITUTE OF TERAHERTZ TECHNOLOGY AND INNOVATION, Guangdong (CN); SHENZHEN INSTITUTE OF TERAHERTZ TECHNOLOGY AND INNOVATION CO., LTD., Guangdong (CN)

( * ) Notice: Subject to any disclaimer, the term of this patent is extended or adjusted under 35 U.S.C. 154(b) by 0 days.

(21) Appl. No.: 16/660,109

(22) Filed: Oct. 22, 2019

(65) Prior Publication Data

US 2020/0136698 A1 Apr. 30, 2020

(30) Foreign Application Priority Data

Oct. 24, 2018 (CN) .......................... 201811243825.0

(51) Int. Cl.
*H04B 7/06* (2006.01)
(52) U.S. Cl.
CPC ......... *H04B 7/0617* (2013.01); *H04B 7/0686* (2013.01)

(58) Field of Classification Search
CPC .................................................. H04B 7/0617
See application file for complete search history.

(56) References Cited

U.S. PATENT DOCUMENTS

| | | | | |
|---|---|---|---|---|
| 2013/0272220 | A1* | 10/2013 | Li | H04W 72/046 370/329 |
| 2017/0078001 | A1* | 3/2017 | Kim | H04B 7/0617 |
| 2020/0052755 | A1* | 2/2020 | Hwang | H04B 7/063 |

OTHER PUBLICATIONS

S. Go et al., "Hybrid Beamforming for Large Scale Array Antenna in Wireless Ultra-Wide Area Backhaul Network," 2017 IEEE 85th Vehicular Technology Conference (VTC Spring), Sydney, NSW, 2017, pp. 1-6, doi: 10.1109/VTC Spring. 2017.*

* cited by examiner

*Primary Examiner* — Kevin Kim
(74) *Attorney, Agent, or Firm* — Panitch Schwarze Belisario & Nadel LLP (57) ABSTRACT

A dynamic signal transmission structure based on a hybrid beamforming technology includes a radio-frequency module and an antenna array connected therewith. The radio-frequency module includes one or more radio-frequency link units connected in parallel, the antenna array includes one or more antenna sub-arrays, and each antenna sub-array is connected with one of the radio-frequency modules. The hybrid beamforming technology includes analog and digital beamforming. In this structure, the analog beamforming parameters and the digital beamforming parameters are constant, and the number of radio-frequency link units in the radio-frequency module, the number of antenna sub-arrays in the antenna array, the analog beamforming parameters, and the digital beamforming parameters are in a quantitative relation. The structure of the antenna array and the number of radio-frequency link units in each radio-frequency module can be adjusted dynamically under the condition where (Continued)

the performance is guaranteed, and accordingly, the hardware complexity is reduced.

7 Claims, 5 Drawing Sheets

DYNAMIC SIGNAL TRANSMISSION STRUCTURE AND BEAMFORMING METHOD

CROSS-REFERENCE TO RELATED APPLICATION

This application claims priority under 35 U.S.C. § 119(b) to Chinese Patent Application No. 201811243825.0, filed Oct. 24, 2018, the disclosure of which is incorporated herein by reference in its entirety.

TECHNICAL FIELD

The invention relates to the technical field of communication, in particular to a dynamic signal transmission structure and a beamforming method.

BACKGROUND

Nowadays, most frequency bands used for wireless mobile communication are microwave frequency bands from 300 MHz to 30 GHz, and due to the insufficiency of the frequency spectrums in use, the achievable maximum wireless-communication speed is limited. Millimeter-wave carrier spectrums and terahertz carrier spectrums having the bandwidths of tens of GHz, hundreds of GHz, and even thousands of GHz can meet the demands of the market for ultrahigh transmission speeds in the next decade, and can adapt to the sharp increase of wireless communication data at present.

As for the short-wavelength characteristic of the terahertz frequency bands, beamforming technologies can be adopted to increase the transmission distances and transmission speeds of millimeter-wave electromagnetic waves and terahertz electromagnetic waves. Existing beamforming technologies include a full-digital beamforming technology and a full-analog beamforming technology, wherein the hardware complexity of signal transmission structure formed on the basis of the full-digital beamforming technology is excessively high, and the performance of a signal transmission structure formed on the basis of the full-analog beamforming technology has its drawbacks, and consequentially, reduction of the hardware complexity and improvement of the performance of the signal transmission structure cannot be realized at the same time.

SUMMARY

To settle the above-mentioned issues, it's necessary to provide a dynamic signal transmission structure and a beamforming method to simplify a hardware structure and to realize desired performance.

A dynamic signal transmission structure based on a hybrid beamforming technology comprises a radio-frequency module and an antenna array connected with the radio-frequency module, wherein:

The radio-frequency module comprises one or more radio-frequency link units connected in parallel;

The antenna array comprises one or more antenna sub-arrays, and each antenna sub-array is connected with one of radio-frequency modules;

The hybrid beamforming technology comprises analog beamforming and digital beamforming; and In this structure, the analog beamforming parameters and the digital beamforming parameters are constant, and the number of the radio-frequency link units in the radio-frequency module, the number of the antenna sub-arrays in the antenna array, the analog beamforming parameters, and the digital beamforming parameters are in a quantitative relation.

In one embodiment, the antenna sub-array comprises a plurality of antennae, each radio-frequency link unit in the radio-frequency module is connected with each antenna in the corresponding antenna sub-array, and a modulator is connected in series between each radio-frequency link unit in the radio-frequency module and each antenna in the corresponding antenna sub-array.

In one embodiment, the modulator is a phase shifter.

In this structure, under the condition where beamforming parameters are constant, the hardware complexity can be reduced by dynamically adjusting the structure of the antenna arrays and the number of the radio-frequency link units in each radio-frequency module, namely by changing the values of m and n, without changing the performance.

A beamforming method comprises the following steps:

Designing an antenna array, and dividing the antenna array into one or more antenna sub-arrays, wherein each antenna sub-array is controlled by one radio-frequency module;

Determining the number of radio-frequency link units in the radio-frequency module;

Establishing a channel model of a frequency band of electromagnetic waves;

Obtaining analog beamforming parameters and digital beamforming parameters by calculation according to a channel matrix in the channel model; and Carrying out beamforming according to the analog-beamforming parameters and digital-beamforming parameters.

In one embodiment, the step of obtaining the analog beamforming parameters and the digital beamforming parameters by calculation according to the channel matrix in the channel model comprises the following steps:

Carrying out singular value decomposition on the channel matrix in the channel model to obtain a solution to a right singular-value matrix; and Obtaining the analog beamforming parameters and the digital beamforming parameters by calculation according to the solution to the right singular-value matrix.

In one embodiment, the analog beamforming parameters and the digital beamforming parameters are obtained by calculation according to the solution to the right singular-value matrix based on a sparse coding algorithm.

In one embodiment, the maximum frequency spectral efficiency of hybrid beamforming of the dynamic signal transmission structure is solved to obtain a relation between the solution to the right singular-value matrix, and the analog beamforming parameters and the digital beamforming parameters.

In one embodiment, an algorithm for solving the maximum frequency spectral efficiency of hybrid beamforming of the dynamic signal transmission structure is obtained based on an actual transmission signal, a pre-coded and combined equivalent channel, and a combined noise covariance matrix.

In one embodiment, the channel model of the frequency band of the electromagnetic waves is established based on a ray tracing technology.

In one embodiment, the channel model of the frequency band of the electromagnetic waves is a multi-user, multi-input and multi-output channel model.

According to the beamforming method mentioned above, the beamforming parameters capable of maximizing the performance of the dynamic signal transmission structure are worked out according to pre-set hardware parameters, beamforming is carried out based on the beamforming parameters, and the structure of the antenna array in the dynamic signal transmission structure and the number of the radio-frequency link units in each radio-frequency module can be adjusted dynamically to obtain a dynamic signal transmission structure with the hardware complexity lower than the full-digital beamforming technology, and having the performance approximate to the full-digital beamforming technology.

BRIEF DESCRIPTION OF THE DRAWINGS

In order to more clearly explain the technical solutions of the embodiments of this application or the prior art, the drawings to be used for the description of this embodiments or the prior art are briefly introduced as follows. Clearly, the drawings in the following description are only illustrative ones of this application, and those ordinarily skilled in this field can acquire drawings of other embodiments according to these illustrative ones without creative labor.

DETAILED DESCRIPTION OF EMBODIMENTS

For a better understanding of the objectives, technical solutions, and advantages of the invention, the invention is further expounded below with reference to the accompanying drawings and embodiments. It would be appreciated that the embodiments described here are used for explaining the invention only, but are not for the purpose of limiting the invention.

A dynamic signal transmission structure is based on a hybrid beamforming technology which comprises analog beamforming and digital beamforming. In this dynamic signal transmission structure, analog-beamforming parameters and digital-beamforming parameters are constant, and the number of radio-frequency link units in a radio-frequency module 100, the number of antenna sub-arrays 201 in an antenna array 200, the analog beamforming parameters, and the digital beamforming parameters are in a quantitative relation.

As shown in FIG. 1 to FIG. 4, the dynamic signal transmission structure comprises a radio-frequency module 100 and an antenna array 200 connected with the radio-frequency module 100, wherein:

The radio-frequency module 100 comprises n radio-frequency link units connected in parallel; the antenna array 200 comprises in antenna sub-arrays 201, and each antenna sub-array 201 is connected with one radio-frequency module 100; and the radio-frequency link units in the radio-frequency module 100 and the antenna sub-arrays 201 in the antenna array 200 are in a quantitative relation.

According to actual needs, users can pre-set the value of the number m of the antenna sub-arrays, and then the value of the number n of the radio-frequency link units in the each radio-frequency module 100 can be obtained by calculation; or the users can pre-set the value of the number n of the radio-frequency link units in each radio-frequency module 100, and then the value of the number m of the antenna sub-arrays in the antenna array 200 can be obtained by calculation. In this way, the structure of the antenna array and the number of the radio-frequency link units in each radio-frequency module can be adjusted dynamically under the condition where the performance of the structure is guaranteed, and accordingly, the hardware complexity is reduced.

Specifically, the total number Nt of antennae in the antenna array is a pre-set value, the radio-frequency module 100 comprises n radio-frequency link units, the antenna array 200 comprises in antenna sub-arrays 201, and each antenna sub-array 201 is connected with one radio-frequency module 100, namely, the total number Lt of the radio-frequency link units meets Lt=m*n.

In one embodiment, as shown in FIG. 1 to FIG. 4, each antenna sub-array 201 comprises one or more antennae, each radio-frequency link unit in the radio-frequency module 100 is connected with each antenna in the corresponding antenna sub-array 201, and a modulator 300 is connected in series between each radio-frequency link unit in the radio-frequency module 100 and each antenna in the corresponding antenna sub-array 201, namely, the total number B. of the modulators 300 meets Bt=Nt*n.

In a signal transmission structure based on the full-digital beamforming technology, Lt=Nt.

Figure 1:
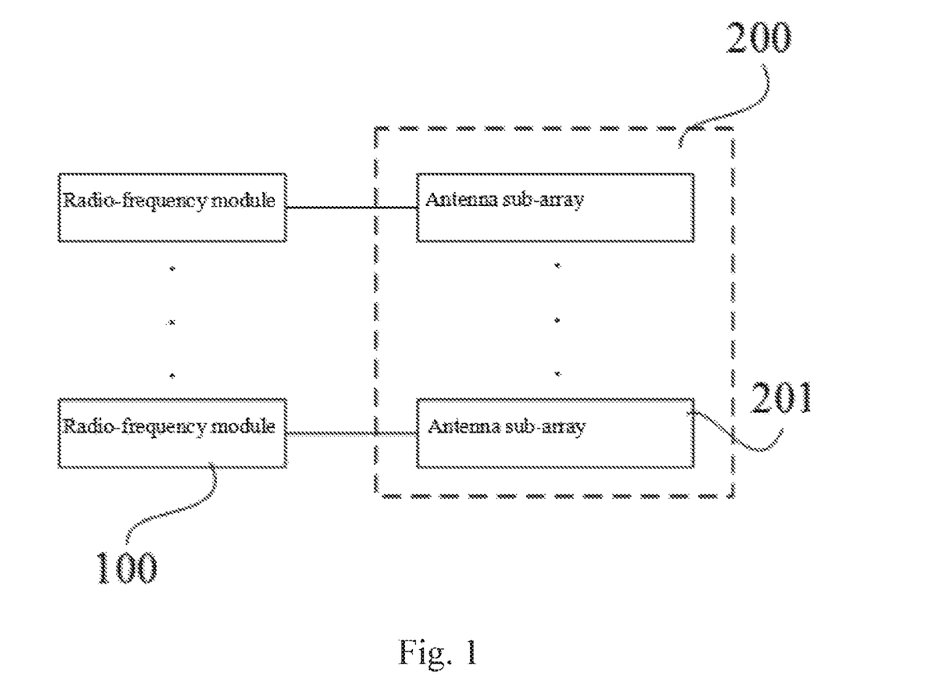
FIG. 1 is a structural view of a dynamic signal transmission structure in one embodiment.
Figure 2:
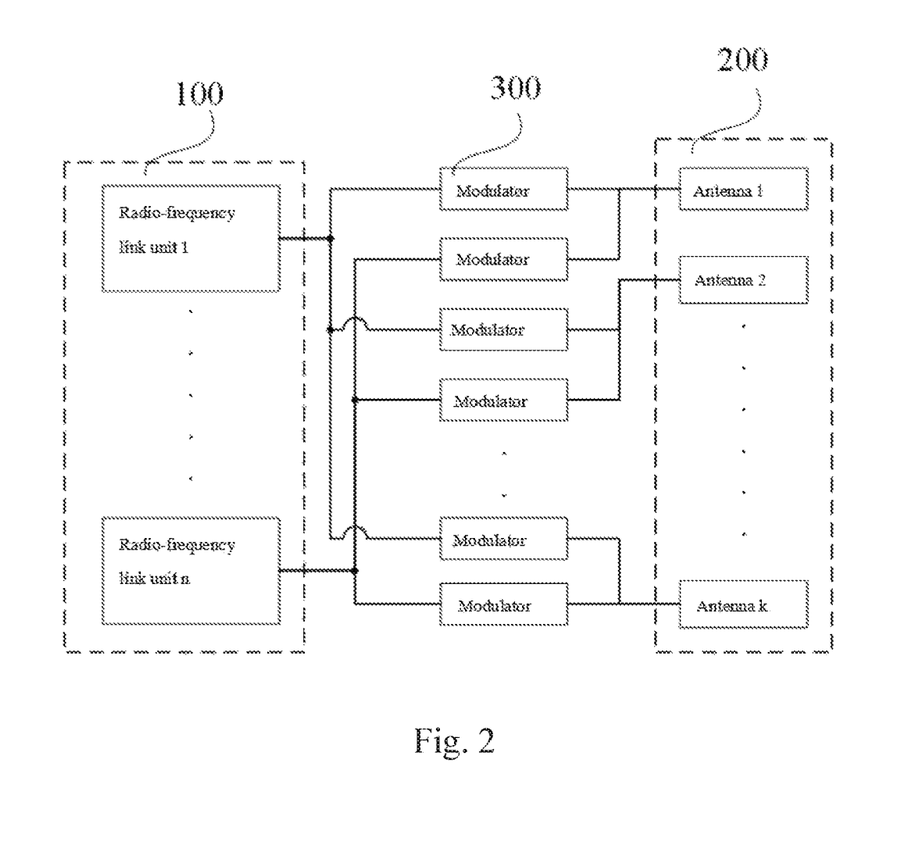
FIG. 2 is a specific structural view of the dynamic signal transmission structure in one embodiment.

In one embodiment, as shown in FIG. 2, m=1, and correspondingly, n=Lt. In this case, the antenna array is called an integrally-connected structure, namely, the antenna array 200 is not divided into a plurality of sub-arrays, and only one radio-frequency module 100 is configured.

Figure 3:
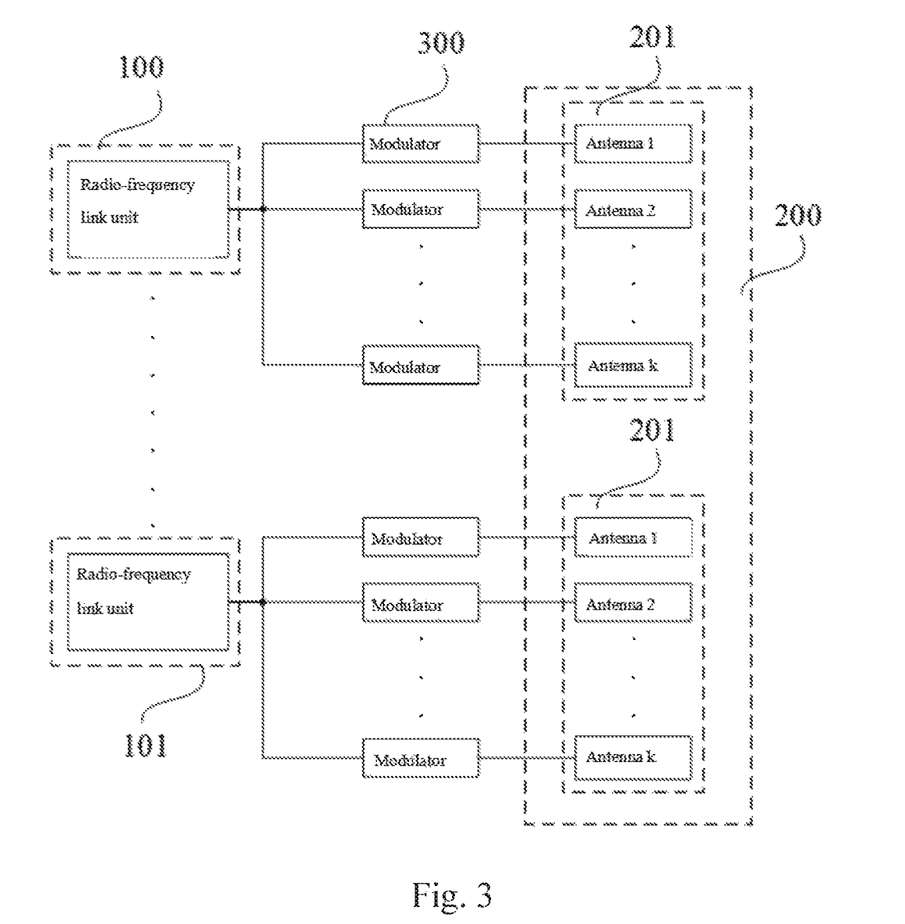
FIG. 3 is a specific structural view of the dynamic signal transmission structure in another embodiment.

In one embodiment, as shown in FIG. 3, n=1, and correspondingly, m=Lt. In this case, the antenna array is called a single-sub-array structure, namely each radio-frequency module 100 comprises one radio-frequency link unit, and each radio-frequency link unit is connected with one antenna sub-array 201.

Figure 4:
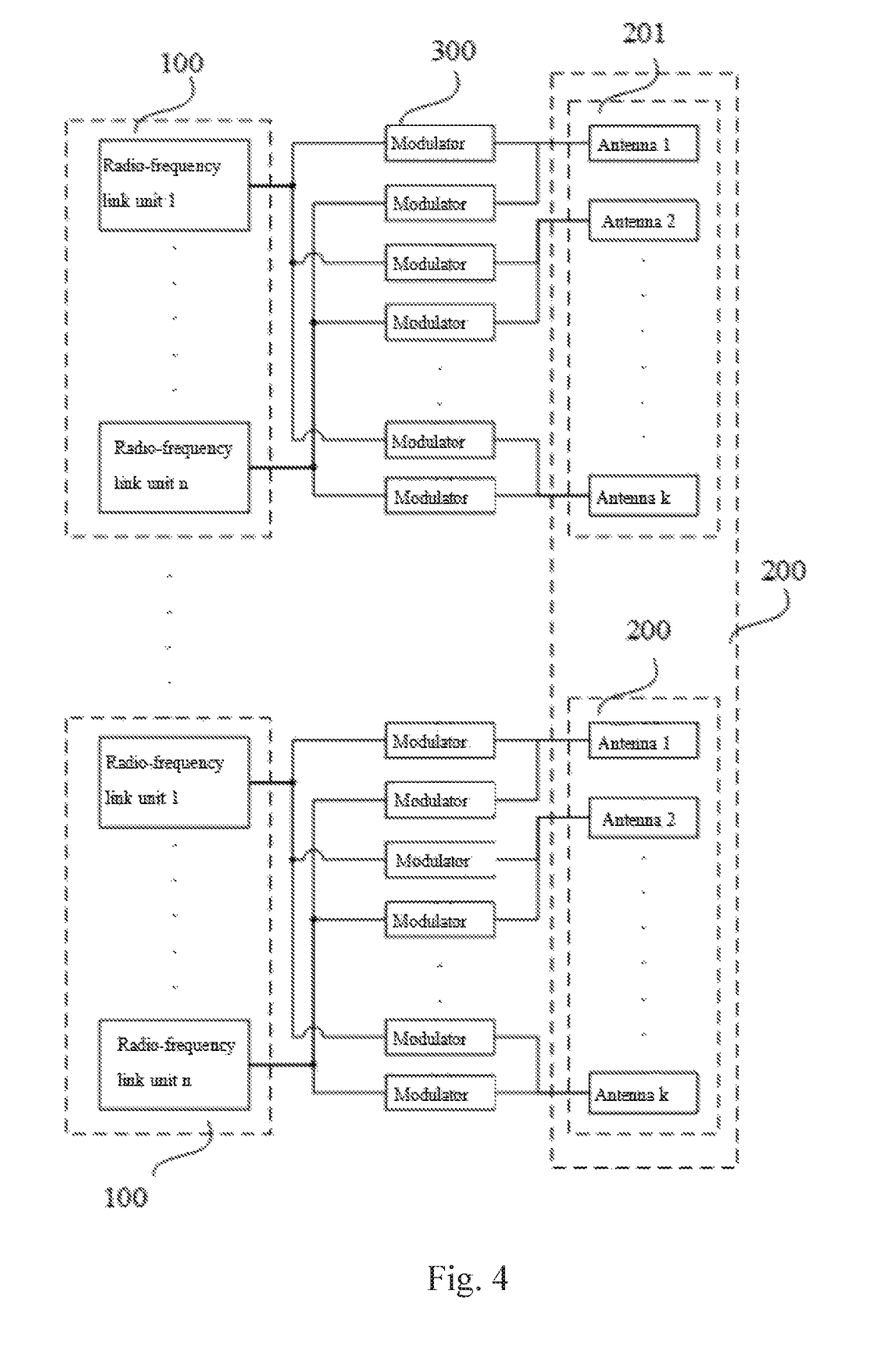
FIG. 4 is a specific structural view of the dynamic signal transmission structure in another embodiment.

In one embodiment, as shown in FIG. 4, m≠1, and n≠1, and correspondingly, Lt=m*n. In this case, the dynamic signal transmission structure is based on a sub-array hybrid-beamforming technology, namely, each radio-frequency link unit controls Nat antennae, each radio-frequency module 100 comprises a plurality of radio-frequency link units, the antenna array 200 is divided into a plurality of antenna sub-arrays 201, and the radio-frequency link units in each radio-frequency module 100 are connected with the antennae in the corresponding antenna sub-arrays 201.

In the dynamic signal transmission structure, the total number of the radio-frequency link units is Lt/Nt times that of radio-frequency link units in the dynamic signal transmission structure based on the full-digital beamforming technology.

Under the condition where the beamforming parameters are constant, the hardware complexity can be reduced by dynamically adjusting the structure of the antenna array and the number of the radio-frequency link units in each radio-frequency module, namely by changing the values of m and n, without changing the performance of the structure.

Preferably, the modulator 300 is a phase shifter.

Figure 5:
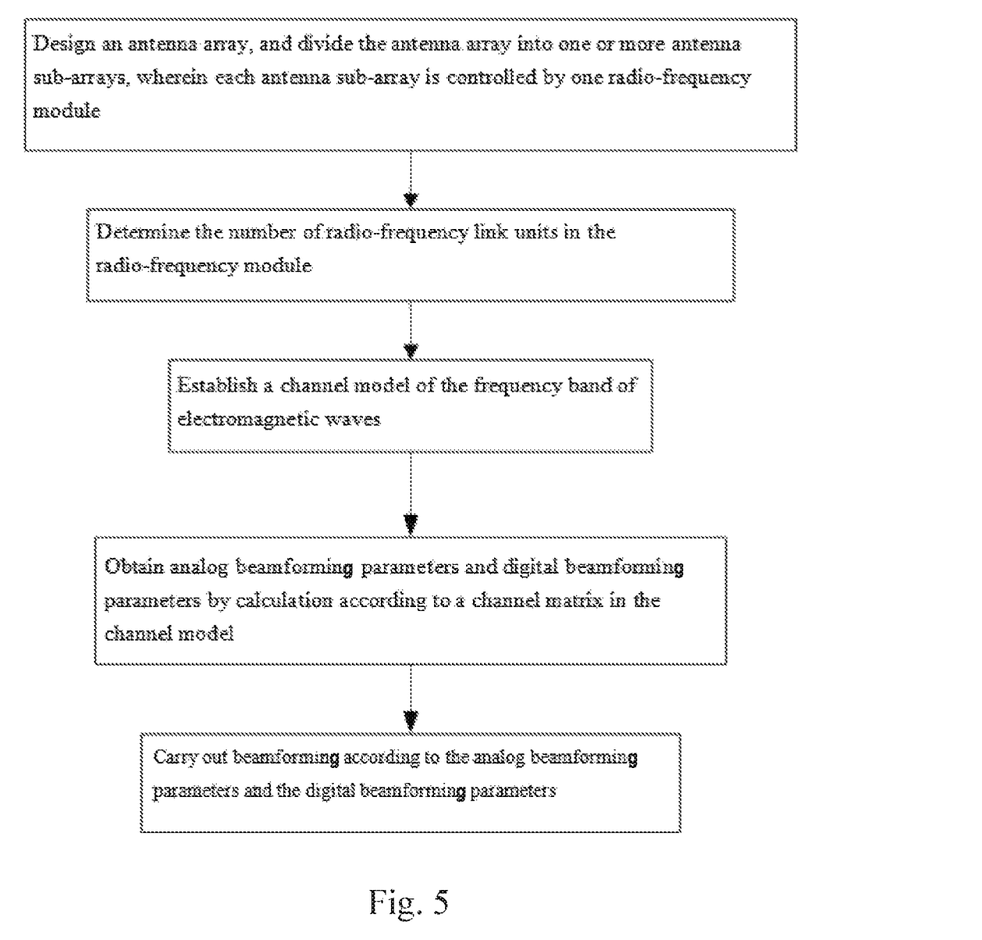
FIG. 5 is a flow diagram of a beamforming method in one embodiment.

As shown in FIG. 5, a beamforming method comprises the following steps:

An antenna array 200 is designed and is divided into m antenna sub-arrays 201 wherein each antenna sub-array 201 is controlled by one radio-frequency module 100;

The number n of radio-frequency link units in the radio-frequency module 100 is determined;

A channel model of a frequency band of electromagnetic waves is established;

The analog beamforming parameters $P_A$ and the digital beamforming parameters $P_D$ are obtained by calculation according to a channel matrix H in the channel model of the frequency band of the electromagnetic waves; and Beamforming is carried out according to the analog beamforming parameters and the digital beamforming parameters.

Specifically, the antenna array 200 comprises m antenna sub-arrays 201, the radio-frequency module 100 comprises n radio-frequency link units, and each antenna sub-array 201 is connected with one radio-frequency module 100.

The electromagnetic waves are millimeter waves or a terahertz waves.

A structural formula for beamforming is as follow:

$$y=\sqrt{\rho}C_D^H C_A^H H P_A P_D s + C_D^H C_A^H n_0 \quad (1)$$

In the above structural formula, $\rho$ is the total transmitting power, s and y are transmitted signal and received signal of the number ($N_s \times 1$) of one data flow, H is the channel matrix of the channel model of the frequency band of the electromagnetic waves, $P_A$ and $C_A$ are the analog beamforming parameters, $P_D$ and $C_D$ are the digital beamforming parameters, and $n_0$ is the channel noise. Wherein, $P_A$ is a pre-coded code of an analog domain, $C_A$ is a combined matrix of the analog domain, $P_D$ is a pre-coded code of a digital domain, $C_D$ is a combined matrix of the digital domain, and $C_D^H C_A^H n_0$ is a combined noise vector.

The structure of a coding matrix of a $L_t \times N_s$-dimensional digital domain formed by the total number $L_t$ of the radio-frequency link units and the number $N_s$ of data flows is as follow:

$$P_D = [P_{D1}^T \ldots P_{Dm}^T]^T, \quad (2)$$

Wherein, $P_{Di}$ is an $n \times N_s$-dimensional matrix, as for a digital pre-coded matrix, there is no equal-modulus limitation on the elements of the matrix, and only the transmission power is limited.

The structure of a coding matrix of an $N_t \times L_t$-dimensional analog domain formed by the total number $L_t$ of radio-frequency link units and the number $N_t$ of antennae in the antenna array 200, is as follow:

$$P_A = \begin{bmatrix} P_{A1} & 0 & 0 \\ 0 & P_{A2} & 0 \\ \ldots & \ldots & \ldots \\ 0 & 0 & P_{Am} \end{bmatrix} \quad (3)$$

Wherein, $P_{Ai}$ is an $N_t/m \times n$-dimensional matrix, and 0 is an $N_t/m \times n$-dimensional all-zero matrix. An analog pre-coded matrix is realized through a phase shifter network, and thus there is an equal-modulus limitation on the elements in each column of vectors in $P_{Ai}$.

Beamforming parameters capable of maximizing the performance of the dynamic signal transmission structure are worked out according to pre-set hardware parameters. Preferably, the hardware parameters here are set with reference to the parameters of the dynamic signal transmission structure based on full-digital beamforming.

Beamforming is carried out according to the above-obtained parameters; and the structure of the antenna array 200 in the dynamic signal transmission structure and the number of the radio-frequency link units in each radio-frequency module 100 can be adjusted dynamically to obtain a dynamic signal transmission structure with the hardware complexity lower than the full-digital beamforming technology, and having the performance approximate to the full-digital beamforming technology.

In one embodiment, the step of obtaining the analog beamforming parameters $P_A$ and the digital beamforming parameters $P_D$ by calculation according to the channel matrix H in the channel model of the frequency band of the electromagnetic waves comprises the following steps:

Singular value decomposition is carried out on the channel matrix in the channel model to obtain a solution $P_{opt}$ to a right singular-value matrix; and The analog beamforming parameters $P_A$ and the digital beamforming parameters $P_D$ are obtained by calculation according to the solution $P_{opt}$ to the right singular-value matrix.

The solution $P_{opt}$ to the right singular-value matrix, obtained through singular value decomposition carried out on the channel matrix in the channel model, is in a front $N_s$ columns of the right singular-value matrix after the singular value decomposition (SVD) is carried out on the channel matrix H, and the singular value decomposition is an important matrix decomposition in linear algebra, and it is the promotion of eigen decomposition on any matrices, and has important application value in the fields of signal processing, statistics, and so on.

According to the solution $P_{opt}$ to the right singular-value matrix, the analog beamforming parameters $P_A$ and the digital beamforming parameters $P_D$ can be obtained by calculation according to the following formula (4):

$$(\tilde{P}_A, \tilde{P}_D) = \underset{P_A, P_D}{\operatorname{argmin}} \|P_{opt} - P_A P_D\|_F \quad (4)$$

$$\text{s.t. } P_A \in \mathcal{P}_A, \|P_A P_D\|_F^2 = N_s,$$

In formula (4), $\mathcal{P}_A$ is a value set meeting equal-modulus limitation of $P_A$.

In one embodiment, the analog beamforming parameters $P_A$ and the digital beamforming parameters $P_D$ are obtained by calculation according to the solution to the right singular-value matrix based on a sparse coding algorithm. The channel matrix can be divided into m independent parts to respectively solve $P_A$ and $P_D$ on the basis of the sparse coding algorithm according to the formula (2), formula (3), and formula (4).

In one embodiment, the maximum frequency spectral efficiency of hybrid beamforming of the dynamic signal transmission structure is solved to obtain a relation between the solution $P_{opt}$ to the right singular-value matrix, and the analog beamforming parameters $P_A$ and the digital beamforming parameters $P_D$.

An actual transmission signal is as follow:

$$x=\sqrt{\rho}s,$$

A pre-coded and combined equivalent channel is as follow:

$$H_e = C_D^H C_A^H H P_A P_D,$$

A combined noise covariance matrix is as follow:

$$R_{n_0} = \sigma_{n_0}^2 C_D^H C_A^H C_A C_D,$$

An algorithm for maximizing the frequency spectral efficiency of hybrid beamforming of the dynamic signal transmission structure is obtained according to the actual transmission signal x, the pre-coded and combined equivalent channel $H_e$, and the combined noise covariance matrix $R_{n_0}$. In the structural formula of beamforming, the frequency spectral efficiency of hybrid beamforming is as follow:

$$R = \log_2\left(\left|I_{N_s} + \frac{\rho}{N_s} R_{n_0}^{-1} C_D^H C_A^H H P_A P_D P_D^H P_A^H H^H C_A C_D\right|\right), \quad (5)$$

Proper $P_A$, $C_A$, $P_D$ and $C_D$ can be searched out to maximize the frequency spectral efficiency R through formula (5).

In one embodiment, the channel model of the frequency band of the electromagnetic waves is established based on a ray tracing technology.

In one embodiment, the channel model of the frequency band of the electromagnetic waves is a multi-user, multi-input and multi-output channel model.

According to the above-mentioned beamforming method, the parameters capable of maximizing the performance of the dynamic signal transmission structure are worked out according to pre-set hardware parameters, beamforming is carried out based on the beamforming parameters, and the structure of the antenna array in the dynamic signal transmission structure and the number of the radio-frequency link units in each radio-frequency module can be adjusted dynamically to obtain a dynamic signal transmission structure with the hardware complexity lower than the full-digital beamforming technology and having the performance approximate to the fully-analog beamforming technology.

The technical characteristics of the above embodiments can be arbitrarily combined, and for the sake of a brief description, not all possible combinations of the technical characteristics of the above embodiments are described. As long as they are not contradictory, all these combinations of the technical characteristics should also fall within the scope recorded in this specification.

The above embodiments are specifically described in detail to show several implementations of invention, but should not be understood as limitations on the scope of the patent of invention. It should be noted that those ordinarily skilled in this field are permitted to make several deformations and improvements without deviating from the conception of the invention, and all these deformations and improvements should also fall within the protection scope of the invention. Thus, the protection scope of the patent of invention should be subject to the appended claims.

What is claimed is:

1. A dynamic signal transmission structure based on a hybrid beamforming technology, comprising a radio-frequency module and an antenna array connected with the radio-frequency module, wherein:
   the radio-frequency module comprises one or more radio-frequency link units connected in parallel;
   the antenna array comprises one or more antenna sub-arrays, and each said antenna sub-array is connected with one of said radio-frequency modules;
   the hybrid beamforming technology comprises analog beamforming and digital beamforming; and
   in the structure, analog beamforming parameters and digital beamforming parameters are constant, and the number of the radio-frequency link units in the radio-frequency module, the number of the antenna sub-arrays in the antenna array, the analog beamforming parameters and the digital beamforming parameters are in a quantitative relation,
   wherein the analog beamforming parameters and the digital beamforming parameters are obtained according to a solution to a right singular-value matrix, which is obtained by carrying out singular value decomposition on a channel matrix in a channel model of a required frequency band of electromagnetic waves.

2. The dynamic signal transmission structure according to claim 1, wherein the antenna sub-array comprises a plurality of antennae, each said radio-frequency link unit in the radio-frequency module is connected with each said antenna in the corresponding antenna sub-array, and a modulator is connected in series between each said radio-frequency link unit in the radio-frequency module and each said antenna in the corresponding antenna sub-array.

3. The dynamic signal transmission structure according to claim 2, wherein the modulator is a phase shifter.

4. A beamforming method, comprising:
   designing an antenna array, and dividing the antenna array into one or more antenna sub-arrays, wherein each said antenna sub-array is controlled by a radio-frequency module;
   determining the number of radio-frequency link units in the radio-frequency module;
   establishing a channel model of a required frequency band of electromagnetic waves;
   obtaining analog beamforming parameters and digital beamforming parameters by calculation according to a channel matrix in the channel model; and
   carrying out beamforming according to the analog beamforming parameters and the digital beamforming parameters;
   wherein the obtaining the analog beamforming parameters and the digital beamforming parameters by calculation according to the channel matrix in the channel model comprises:
      carrying out singular value decomposition on the channel matrix in the channel model to obtain a solution to a right singular-value matrix; and
      obtaining the analog beamforming parameters and the digital beamforming parameters according to the solution to the right singular-value matrix.

5. The beamforming method according to claim 4, wherein the analog beamforming parameters and the digital beamforming parameters are obtained by calculation according to the solution to the right singular-value matrix and based on a sparse coding algorithm.

6. The beamforming method according to claim 4, wherein a maximum frequency spectral efficiency of hybrid beamforming of a dynamic signal transmission structure is solved to obtain a relation between the solution to the right singular-value matrix, and the analog beamforming parameters and the digital beamforming parameters.

7. The beamforming method according to claim 6, wherein an algorithm for maximizing the frequency spectral efficiency of hybrid beamforming of the dynamic signal transmission structure is obtained, based on an actual transmission signal, a pre-coded and combined equivalent channel, and a combined noise covariance matrix.

* * * * *